M. H. FRANK.
MUD HOOK.
APPLICATION FILED MAR. 5, 1921.

1,399,952.

Patented Dec. 13, 1921.

Witness
Lynn Latta

Inventor
Maurice H. Frank
By Bair & Freeman Attorneys

UNITED STATES PATENT OFFICE.

MAURICE HELTON FRANK, OF ANTHON, IOWA.

MUD-HOOK.

1,399,952.  Specification of Letters Patent.  Patented Dec. 13, 1921.

Application filed March 5, 1921. Serial No. 449,878.

*To all whom it may concern:*

Be it known that I, MAURICE H. FRANK, a citizen of the United States, residing at Anthon, in the county of Woodbury and State of Iowa, have invented a certain new and useful Mud-Hook, of which the following is a specification.

The object of my invention is to provide a mud hook of simple, durable and inexpensive construction.

More particularly it is my object to provide a mud hook comprising spaced angle iron members having a non skid block detachably received between the spaced angle iron members. The angle iron members being curved from end to end so as to conform to the contour of the tread of the tire.

Still another object is to provide a non skid member or mud hook, having a central non skid block detachably fixed to the mud hook; and hinged portions so that the parts may adjust themselves to the contour of various sizes of tires.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1:
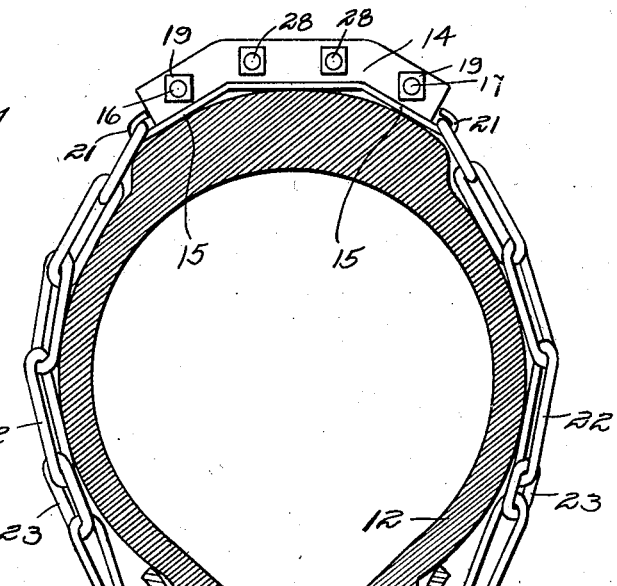
Figure 1 is a central, sectional view taken through a tire showing my device installed thereon.

In the accompanying drawings I have used the reference numeral 10 to indicate an ordinary felly of a wheel which is provided with a rim 11 and a tire 12.

My device comprises a pair of spaced angle iron members 13 and 14 which are similar in construction and having their ends slightly bent as at 15 so as to conform to the contour of the tire 12.

In order to properly hold the angle iron members 13 and 14 spaced from each other and against movement relative to each other, I provide spacing rods 16 and 17 which have their ends screw threaded as at 18. The rods 16 and 17 are extended through registering openings provided in the portion 15 of the angle iron members 13 and 14.

Figure 2:
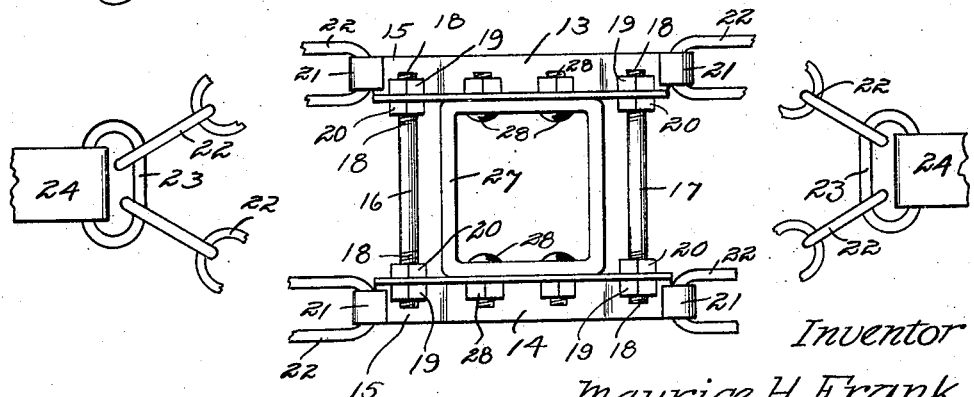
Fig. 2 is a top, plan view of my device, parts being broken away to better illustrate the construction.

Nuts 19 and 20 are fixed to each of the screw threaded ends 18 of the rods 16 and 17. The nuts 20 rest against the inner side of the angle irons 13 and 14; while the nuts 19 rest against the outer sides, as illustrated in Fig. 2 of the drawings.

From the construction of the parts just described it will be seen that I have provided a rigid mud hook member which is comparatively simple and yet very strong.

The ends of the portions 15 of the angle iron members 13 and 14 are bent upon themselves so as to form loops or hook portions 21.

Received in the loops 21 are the chains 22, which have their free ends connected together by a link 23. The ends of the chains 22 are inclined toward each other so that the free ends may be connected together by the links 23.

Extended through the links 23 is a strap 24 having a buckle device 25 fixed to one of its ends. The free end of the strap 24 is designed to coact with the tongue 26 of the buckle device.

The chains 22 and the strap 24 extend around the tire for holding the mud hook in position. The strap 24 passes around the rim 11 and the felly 10.

Received between the angle irons 13 and 14, and between the spacing rods 16 and 17 is a non skid member 27 which is angular in outline. The non skid member 27 is provided with openings which register with openings in the angle iron members 13 and 14.

Extended through the openings are the bolts 28 which provide a means for fastening the non skid member 27 to the angle irons 13 and 14.

It will be seen that the non skid block or member 27 may be removed from the mud hook easily.

It will be seen that the angle iron members 13 and 14 provide gripping surface for providing traction for the wheel while the spacing rods 16 and 17, and the sides of the non skid block 27 prevent sideward skidding of the wheel.

The non skid block 27 which has its upper edge flush with the upper edge of the angle iron members 27 adds rigidity to the entire mud hook so that a comparatively light angle iron may be used in my improved construction.

By making the non skid block 27 I am able to remove it when it comes worn from use and easily install a new one.

Figure 3:
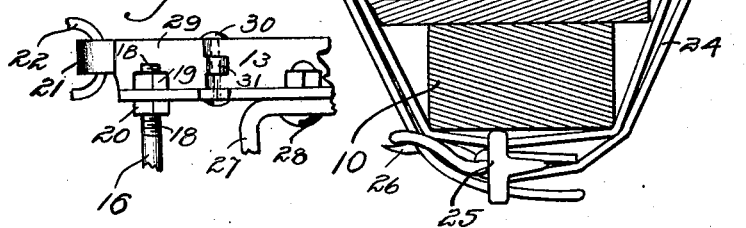
Fig. 3 is a slightly modified form in which the angle iron members are provided with hinged connections.

In Fig. 3 of the drawings I have shown a slightly modified form in which the angle irons 13 and 14 have hinged to their ends a portion 29 by means of the rivet or pin 30 which serves as a pintle. The ends of the portion 29 and the angle irons are provided with co-acting loops 31 through which is extended the pintle or pivot 30.

The portion 29 is provided with spacing rods 16 and 17 similar to the form of device shown in Fig. 2. The hinged portions 29 are provided with loops 21 in which are received the ends of the chains 22.

By providing the hinged portion 29 it will be seen that the mud hook will readily and easily conform to the various contours of various sizes of tires.

The parts of the mud hook as shown in Fig. 3 will maintain sufficient rigidity so as to successfully use this form of device as a mud hook.

The advantage of this form is the adaptability of it to various sizes of tires.

It will be seen that my device is made of simple parts, some of the parts being interchangeable for repairs, which makes the device very practical.

Some changes may be made in the construction and arrangement of the parts of my device without departing from the real spirit and purpose of my invention, and it is my intention to cover by my claims, any modified forms of structure, or use of mechanical equivalents, which may be reasonably included within their scope.

I claim as my invention:

1. A mud hook comprising a pair of spaced angle iron members adapted to extend transversely across the tread of a tire, a pair of spacing rods extended through registering openings in said angle iron members for spacing said angle irons relative to each other, a non skid block received between said angle iron members and between said spacing rods, said non skid block being detachably fixed to said angle irons, the upper edge of said non skid block being flush with the upper edge of said angle iron members, loops formed on the ends of said angle iron members, chains fixed to each of the ends in said loops, the free ends of the adjacent chains being fastened together, and a strap and buckle device fixed to said chains for securing said mud hook to a wheel as and for the purposes stated.

2. A mud hook comprising a pair of spaced angle iron members adapted to extend transversely across the tread of a tire, a pair of spacing rods extended through registering openings in said angle iron members for spacing said angle irons relative to each other, a non skid block received between said angle iron members and between said spacing rods, said non skid block being detachably fixed to said angle irons, the upper edge of said non skid block being flush with the upper edge of said angle iron members, loops formed on the ends of said angle iron members, chains fixed to each of said ends in said loops, a pair of links for fastening the free ends of the adjacent chains together, and a strap and buckle device fixed to said links, whereby the entire mud hook may be secured to a wheel for the purposes stated.

3. A mud hook comprising a pair of spaced angle iron members adapted to extend transversely across the tread of a tire, and said angle irons being curved from end to end so as to substantially conform to the curved surface of the tread of a tire, a pair of spacing rods extended through registering openings in said angle iron members for spacing said angle irons relative to each other, a non skid block received between said angle iron members and between said spacing rods, said non skid block being detachably fixed to said angle irons, the upper edge of said non skid block being flush with the upper edge of said angle iron members, loops formed on the ends of said angle iron members, chains fixed to each of the ends in said loops, the free ends of the adjacent chains being fastened together, and a strap and buckle device fixed to said chains for securing said mud hook to a wheel as and for the purposes stated.

4. A mud hook comprising a pair of spaced angle iron members adapted to extend transversely across the tread of a tire, and said angle irons being provided with hinged portions so as to substantially conform to the curved surface of the tread of the tire, a pair of spacing rods extended through registering openings in said angle iron members for spacing said angle irons relative to each other, a non skid block received between said angle iron members and between said spacing rods, said non skid block being detachably fixed to said angle irons, the upper edge of said non skid block being flush with the upper edge of said angle iron members, loops formed on the ends of said hinged portions, chains fixed to each of the ends in said loops, the free ends of the adjacent chains being fastened together, and a strap and buckle device fixed to said chains for securing said mud lug to a wheel as and for the purposes stated.

Des Moines, Iowa, February 14, 1921.
MAURICE HELTON FRANK.